(No Model.) 3 Sheets—Sheet 1.
I. WANTLING & J. T. JOHNSON.
COAL CUTTING MACHINE.
No. 510,455. Patented Dec. 12, 1893.
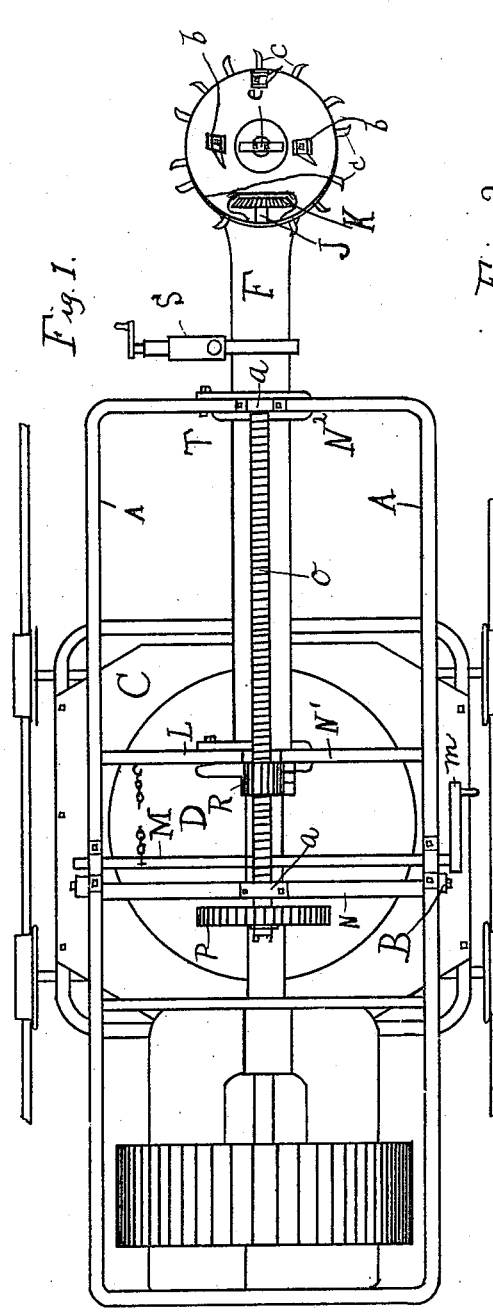
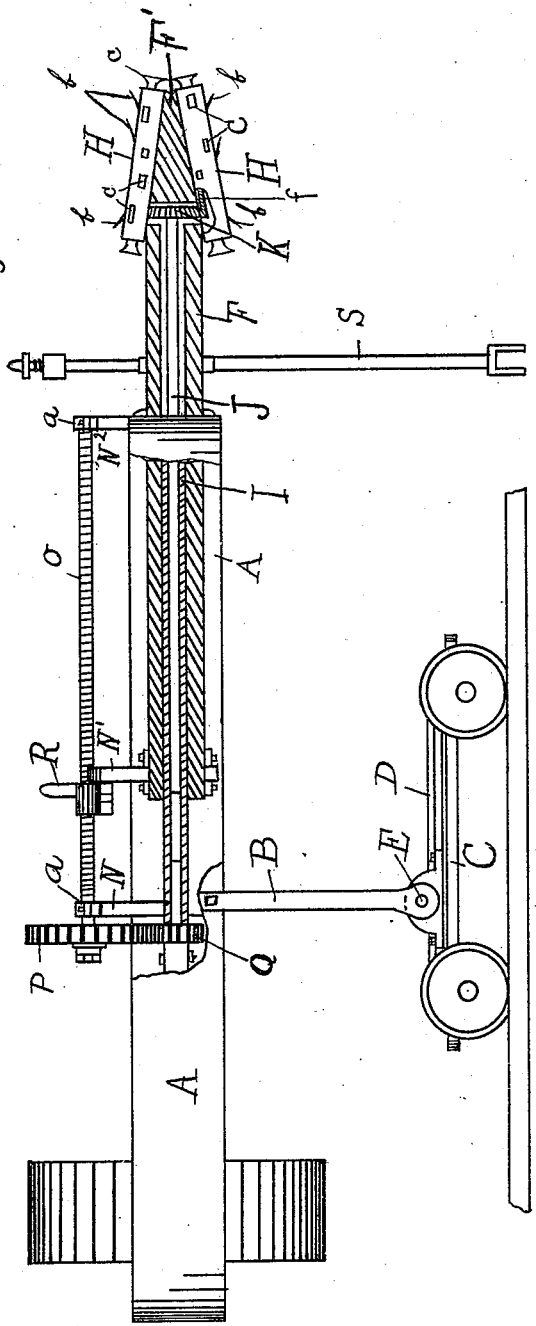
Witnesses
A. S. Kramm
J. W. Maple
Inventors
Isaac Wantling
James T. Johnson
By W. V. Tifft
Atty (No Model.) 3 Sheets—Sheet 2.
I. WANTLING & J. T. JOHNSON
COAL CUTTING MACHINE.
No. 510,455. Patented Dec. 12, 1893.
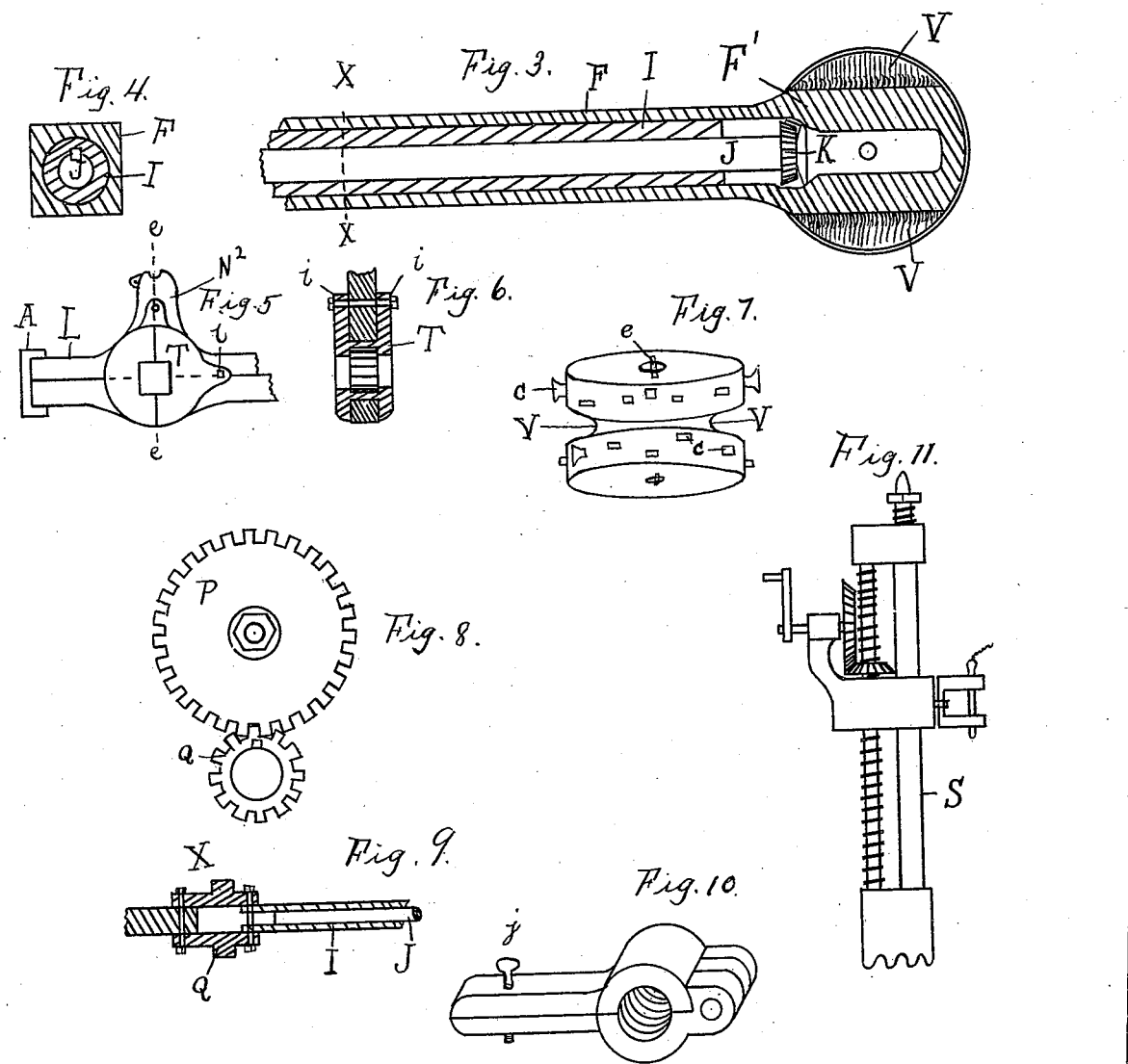

(No Model.)
3 Sheets—Sheet 3.
I. WANTLING & J. T. JOHNSON.
COAL CUTTING MACHINE.
No. 510,455.  Patented Dec. 12, 1893.
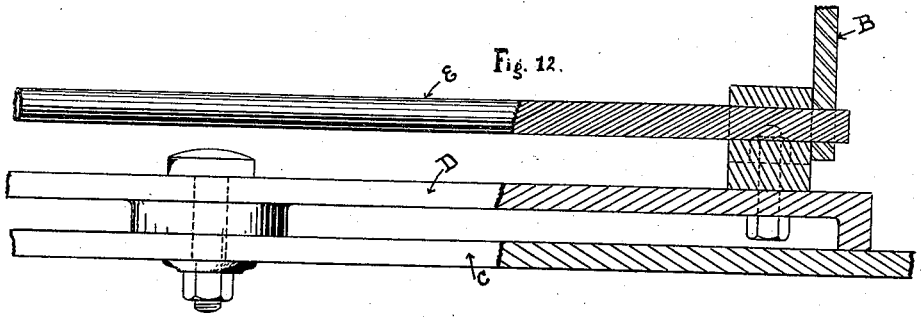
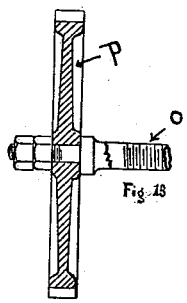

UNITED STATES PATENT OFFICE.

ISAAC WANTLING AND JAMES T. JOHNSON, OF PEORIA, ILLINOIS, ASSIGNORS TO THE HANDY COAL CUTTER COMPANY OF ILLINOIS.

COAL-CUTTING MACHINE.

SPECIFICATION forming part of Letters Patent No. 510,455, dated December 12, 1893.

Application filed May 10, 1893. Serial No. 473,746. (No model.)

*To all whom it may concern:*

Be it known that we, ISAAC WANTLING and JAMES T. JOHNSON, citizens of the United States, residing at Peoria, in the county of Peoria and State of Illinois, have invented certain new and useful Improvements in Coal-Cutting Machines; and we do hereby declare that the following is a full, clear, and exact description of the invention, which will enable others skilled in the art to which it appertains to make and use the same.

Our invention relates to certain new and useful improvements in coal cutting machines.

More particularly our invention relates to a machine adapted for coal cutting which object is performed through the agency of a cutting head which is fully explained and illustrated in Letters Patent granted to us, numbered 475,838, May 31, 1892, under the title of coal cutting machine. This application for patent is upon certain improvements thereon relating particularly to the construction and formation of a cutting head and certain auxiliary attachments essential in the economical and effectual operation of the device, which relate particularly to adjusting means, the manner of feeding and the carriage structure upon which the main operative parts are mounted.

Our invention consists essentially of two rotary disks obliquely mounted and provided with cutting tools or blades upon the circumferential peripheries of the respective wheels and also upon their outside faces, and further provided upon their inner faces with suitable gears integral therewith and of a driving gear meshing with the internal gear of the said disks carried upon a shaft bearing rearwardly therefrom.

It further consists in providing a forwardly tapering expanded head upon which the cutter carrying wheels are mounted, said head having a rearwardly extending perforated tubular stem with which is carried the shaft which carries the driving gear and meshes with the internal gear of the rotary disk, of a sleeve inclosed also in a perforated tubular stem, and suitable turning mechanism operated from the power supplied for turning the said sleeve and shaft, and of certain adjusting and feeding means, and still other minor points of detailed structure that will hereinafter be more particularly explained.

That our invention may be more fully understood reference is had to the accompanying drawings, in which—

Figure 1 is a plan view of the machine with the head thereof in adjustment for cutting purposes. Fig. 2 is a side elevation of the machine showing a portion thereof in section. Fig. 3 is a detailed view showing a section through the stem and sleeve carried in the perforation in the stem, a shaft carried in the sleeve, and the expanded portion of the stem upon which disks are designed to be mounted. Fig. 4 is a detailed view showing a section through line X X of Fig. 3. Fig. 5 is a detailed view showing an adjustable mechanism supported in the main frame work of a cross piece thereof within which the stem is designed to be carried. Fig. 6 is a detailed view showing a section through line e e, Fig. 5. Fig. 7 is a front view of the rotary heads in adjustment. Fig. 8 is a view of certain gear connection. Fig. 9 is a detailed view of a coupling. Fig. 10 is a detailed view showing clamping nut. Fig. 11 is a detailed view showing an adjusting mechanism. Fig. 12 is a detailed view of a turn table upon which the machine is mounted. Fig. 13 is a detailed view showing manner of securing cog-wheel upon the thread bar by means of clamping nuts.

In the drawings A is the main frame work within which and upon which are supported the main operative parts of the machine.

B is a bar connecting the frame work A with a truck, which is designed to support the entire machine, there being a similar bar on the opposite side of the machine in the same relative position, both of which said bars are rigidly bolted to the main frame work A and connected with the rod E at their lower extremities, which said rod bears across the truck, and is suitably journaled to provide a free movement of the said rod E.

C is the main body of the truck, which is provided with suitable axles and wheels.

D is an upper or circular plate bearing upon the upper surface of the truck and centrally pivoted thereto by means of a suitable bolt, and upon which are supported the superstructural parts of the machine, the upper plate D being designed to be turned upon the truck body C for the purpose of adjusting the machine in positions for operation, and the structure of the said plates is such as to facilitate an easy operation for this purpose.

F is a stem cored out internally, and expanded at its forward end to form a circular body with obliquely and forwardly tapering sides.

H H are wheels journaled upon studs as e projecting out from the sides of the expanded portion of the stem F, and are provided upon their respective peripheries with a number of suitably adjusted cutting tools as c, c, c, &c., and are provided at their sides with cutting tools b, b, &c., each of the said wheels being internally toothed as at f, the said stem being supported in the main frame work A by passing through a rectangularly formed aperture in the forward part thereof, and provided with a similar and suitable bearing at its rear portion, which is supported upon the cross frame piece L, and within suitable slots in the inner face of the frame work A as illustrated in Fig. 5.

I is a tube placed within the stem F and connected at its rear portion with the power shaft; J is a shaft within the tube I, and is designed to move backwardly and forwardly therein, the same having a spline and groove connection with the said tube as illustrated in Fig. 4, which causes the turning of the said shaft with the tube.

K is a beveled pinion secured to the forward extremity of shaft J which meshes with the internal gear f of wheels H H.

O is a threaded bar journaled as at a—a upon the uprights N, N² and is designed to facilitate a forward movement of the stem F for purposes hereinafter mentioned.

P is a toothed wheel fixed upon the rear extremity of the said threaded bar O.

Q is a toothed wheel meshing therewith and having tubular extensions on each side into which the ends X of the tube I and the motor shaft are respectively inserted.

R is a clamping nut formed in two sections and hinged at one extremity with its other extremity or the respective parts thereof free, which will enable the said nut to be clamped over the threaded bar O. The said clamping nut has a contact relation for connection with the upright piece N', which is secured to the stem F and lies directly under the threaded bar being hollowed out at its upper end to conform with the shape of the said threaded bar.

M is a rod extending across the frame work and is journaled in suitable boxes at its sides, and one end thereof is provided with the crank arm m designed to turn the same as a windlass to wind up the chain n which is connected therewith and with the cross piece L, which supports, and has fixed relation with the stem F, and the windlass and chain so connected with the stem and is intended to draw the same back as will hereinafter be more particularly explained.

S is a post mechanism used in raising and lowering the machine, the detailed structure of which is shown in Fig. 11, which consists essentially of an upright bar provided with a threaded spur at its top, which may be screwed up or down to accommodate it to different heights of room; of a threaded bar journaled in the upper and lower frame portions of the post, a movable bracket through which the threaded bar works, gear mechanism, and a crank arm for operating the said bracket up or down upon the threaded bar as may be desired, and a clevis arrangement swiveled upon a pin projecting from the bracket for carrying the forward end of the stem F, and a pin for securing the same in position, thus providing an arrangement for raising and lowering the cutting head as will hereinafter more particularly be explained.

In Figs. 5 and 6 T is a carrying sleeve formed of two sections, and provided with a rectangular perforation within which the stem F is designed to be fixedly carried, the said sleeve being carried in a circular opening in the cross frame piece L, and within which opening it is designed to be turned for the purpose of shifting the head into different positions, that is from the vertical to the horizontal or the reverse, the said sleeve being provided with arms extending from its periphery at a distance apart of eighty degrees, said extensions being perforated at their extremities for the reception of a bolt for securing it to the cross piece L or standard N² in proper position for either horizontal or vertical cutting as may be desired. There are two of these sleeves one mounted in the cross-piece L which slides with the stem F, the other in the forward extremity of the frame A through which the stem F slides in its forward and rearward movement.

In Figs. 3 and 7 V, V, refer to grooves cut in the circumference of the expanded head F' these grooves being formed or cut at the top and bottom portions of the said expanded head, the exact location of which is indicated in the drawings, and referred to by letters V, V, and are cut to a considerable depth and on lines parallel with the rearwardly extending stem. The purpose of such grooving is to provide a passage for a rib that is left when the cutter head progresses forwardly in a direct line. It will be seen upon examination of the drawings that the machine in operation will leave such rib above referred to one above and one below when the cutter head is adjusted in a vertical position as the cutter wheels on account of being carried upon the forwardly tapering expanded head F' will have an oblique bearing both forwardly, and the cutter wheels rotated starting from a point immediately in front of the said head and traveling in opposite directions, any given cutting tools thereon, and in fact all said cutting tools, as they pass the said point in their revolutions will gradually diverge from a vertical plane through the forward central point, and practice has demonstrated that while the cutting tools will make a full and complete clearance for themselves at all times, and for the expanded head at the point immediately in front, a central seam or rib is left both above and below beginning with a point at the top and the bottom where the cutting tools on the wheels fail to contact with the coal and gradually widening in proportion as the wheels are adjusted to diverge until the vertical line through the center of their axis of rotation is reached, the provision of the groove enabling the head to progress forwardly, the ribs so formed being carried therein thus preventing any obstruction to the forward passage of the head the said grooves being made of sufficient depth to provide for the unobstructed passage of the ribs therethrough this provision enabling the cutter head as a whole, which includes the expanded portion F' thereof as well as the wheels H, H, will bear forwardly without obstruction until the full length of stem on which the cutter head is carried is driven.

In the operation of our device the cutting head of the machine may be adjusted to make both a vertical and a horizontal cut. For the purpose of making a horizontal cut the cutting head, which consists of the wheels H provided with the necessary cutting tools thereon, and carried upon the expanded portion of the stem is adjusted in the horizontal position shown in Figs. 1 and 2, and the other parts of the machine being in the relative positions herein shown, and in such raised or lowered adjustment of the said head through the instrumentality of the post S as may be desired power is applied, and the tubular extension X, which causes the same to be turned, which will turn the sleeve I, which is secured thereto, and the turning of the sleeve will cause the shaft J to be turned therewith because of the spline and groove connection as shown in Fig. 4, and the turning of the shaft upon which is carried the beveled pinion K will turn the said pinion, which meshing with the internal cogs of wheels H, H, will cause the said wheels to be turned in opposite directions. The tubular extension X turning the cogged periphery Q thereon meshing with cogged wheel P, and with it the threaded bar, and the clamping nut R, which is threaded internally as shown in Fig. 10 being secured over the said threaded bar by means of the screw $j$, and in mesh therewith, the turning of the said thread bar in the proper direction will cause the said clamping nut to be borne forward, and as the nut R is secured to the upright N' and the upright rigidly connected with the stem F and cross piece L, the said stem will be borne forward with the ends of this supporting cross piece sliding in the recesses in the frame piece A as shown in Fig. 5, this operation being simultaneous with the operation which rapidly revolves wheels H. This feeding process, which is accomplished through the instrumentality of the threaded bar O and clamping nut R and the other connections will force the cutting head in contact with the adjacent body of coal, and the cutting tools upon the circular peripheries of the respective wheels H being properly adjusted for a given direction of rotation will cut into the said body, as the head is fed forward, and the tools $b$, $b$, &c., adjusted upon the sides in the relative positions shown will assist in clearing the opening thus cut for the passage of the head, and the grooves V, V in the expanded stem will allow any core that may be left to pass therethrough. The head being fed forward the length of the stem, it will be necessary to draw the head and stem back to their original position which is accomplished through and by means of the windlass mechanism consisting of the bar M connected with the cross piece L, by means of chain $n$, the chain being wound upon rod M, by means of the crank arm $m$, which operation is performed after the clamping nut R has been released from the threaded bar O. The clamping nut being again secured upon the threaded bar, and machine adjusted to drive a cut in another location, which may be directly at the side of the hole previously cut, the operation is resumed and continued until a new cut is made and so on indefinitely.

For the purpose of cutting a vertical opening the cutting head is turned to a vertical position, and in order to so turn the head and stem the bolt which passes through the extensions $i$, $i$, on the sleeves T T are removed, and the head is then turned to the vertical position desired when the bolt is inserted to securely hold it in this position, and when properly fixed the power is applied as before and the head is fed forward in the same manner, the operation being identical with that as previously explained in connection with the operation for cutting a horizontal opening.

To facilitate the turning of the machine or the head thereof from side to side, the turn table formed of plates C and D suitably pivoted together is provided, which it will be seen will enable the machine to be turned in any direction desired, and this is particularly advantageous in making a horizontal cut, as it is there necessary to turn the head either to one side or the other or from side to side after the different openings have been cut to place it in position to cut new openings, it being necessary in each instance to move the post S, but the stem or head is neither raised nor lowered but is continually in the same position so far as height is concerned. In cutting coal in order to make the opening extend in a vertical position a cut is first made in one position the head being in vertical adjustment and being withdrawn the slide of the post is caused to be raised or lowered as may be desired thus raising or lowering the head and stem to accommodate the driving of a new opening in another position either above or below as may be desired.

In operating the machine for the purpose of cutting coal the cutting head will sometimes be brought in contact with exceptionally hard substances as for instance sulphur, and if there should be a very large body of the same it might have a tendency to break the machine, and to avoid such a contingency the cog wheel P upon thread bar O is not keyed thereon, but is secured against a collar by means of a nut screwed up in contact therewith, and followed by a clamping nut bearing against said first nut which will hold the cogged wheel P in such rigid adjustment, as will enable it to turn the thread bar; but if the head strike so hard a substance that it could not penetrate it the resistance in such emergency will be such that transmitted will stop the thread bar and the gear wheel Q still turning the cogged wheel P, will cause the same to be turned between the nut and collars on the thread bar, thus acting as a safe guard against breakage resulting from contact with substances that can not be penetrated.

Having thus fully described our invention, what we claim, and desire to secure by Letters Patent, is—

1. The combination in a coal mining machine of the cutting wheels H, H, provided with suitable cutting tools, and with internal gears, a gear wheel meshing therewith rotated by suitable mechanism, the expanded head integrally connected with the rearwardly extending stem and forwardly tapering to provide a wedge formed with grooves in its sides parallel with rearwardly extending stem upon which the cutting wheels are mounted, all substantially as described and set forth.

2. In a coal mining machine, the combination with the stem F, bearing the cutting wheels H, H, shaft J and tube I of the mechanism for turning the said stem consisting of the sleeve T, provided with an opening through which the stem is carried journaled in a circular opening in the frame work A and cross piece L, and provided with extension I provided for securing bolt, all substantially as described and shown.

3. In a coal mining machine, the expanded head F' grooved as at V, V, and forwardly tapering to provide an oblique forward bearing for the cutting wheels H, H, all substantially as described and shown.

4. In a coal mining machine, the expanded head F' grooved as at V, V, and forwardly tapering to provide an oblique bearing for the cutting wheels H, H, and having the rearwardly extending perforated stem F for supporting the driving mechanism for operating the cutting wheels H, H, all substantially as described and set forth.

5. In a coal mining machine, the combination, with the stem F, internally bored having the expanded head F' forwardly tapering to provide an oblique bearing surface and grooved as at V, V, of the wheels H, H, internally cogged, and provided with suitable cutting tools, the shaft J bearing the pinion K, in mesh with the cogs of the wheels H, H, and the sleeve I having a spline and groove connection with shaft J and suitably actuated for rotation, all substantially as described and set forth.

6. In a coal mining machine, the combination with the stem F, internally bored and having the expanded head F' forwardly tapering to provide an oblique bearing surface, and grooved as at V, V, of the wheels H, H, internally cogged and provided with suitable cutting tools, the shaft J, bearing the pinion K in mesh with the cogs, and the wheels H, H, the sleeve I having a spline and groove connection with shaft J and suitably actuated for rotation, and the thread bar O provided with clamping nut R for bearing relation with stem F for feeding the stem forward while the wheels H, H, are rotated for the purpose of cutting coal, all substantially as described and set forth.

7. In a coal cutting machine the stem F, internally bored and having the expanded head F', forwardly tapering and grooved as at V, V, carrying the wheels H, H, internally cogged and driven by pinion meshing therewith connected with shaft J, the rearward extension thereof centrally bored and supporting shaft J, and sleeve K, with the frame work A, suitably grooved for sliding projections provided upon the rearward extremity of said stem, and with an opening in its forward part for the passage through of the said stem, and supported on arms B, journaled in boxes on plate D, connected therewith for tilting the machine and supported upon pivoted plate D, bearing upon plate C of the truck provided for turning the head from side to side, all substantially as described and shown.

8. In a coal cutting machine, the combination of the stem F, provided with the forwardly tapering expanded head F', the cutting wheels H, H, internally cogged, and shaft J provided with gear wheel K meshing with cogs of wheels H, H, the sleeve I having the spline and groove connection with shaft J, the frame A, within which the stem F is carried and suitably formed to enable the said stem to slide back and forth therein as shown, and provided with arms B, rigidly secured to the sides thereof, and connected below by shaft E, journaled in boxes on plate D to enable the machine to be tilted up or down, and the plates C and D supported upon a truck suitably pivoted at their central point to enable the cutter head to be turned from side to side, the feeding mechanism consisting of shaft O suitably journaled and connected with power by suitable cog wheel as P, and provided with clamping nut R having threaded relation with thread bar O, and designed to connect with projection N², connected with stem F, which provides for the forward bearing of the said stem F as the clamping nut R is fed forward on thread bar O, and suitable power for turning sleeve I and thread bar O and suitable connections therewith, all substantially as described and shown.

In testimony whereof we affix our signatures in presence of two witnesses.

ISAAC WANTLING.
JAS. T. JOHNSON.

Witnesses:
W. V. TEFFT,
MINNIE HALEY.